(12) United States Patent
Szajewski et al.

(10) Patent No.: US 8,356,892 B2
(45) Date of Patent: Jan. 22, 2013

(54) INKJET INKS FOR PRINTING ON BOTH PLAIN AND PHOTO-GLOSSY PAPERS

(75) Inventors: Richard P. Szajewski, Rochester, NY (US); David T. Southby, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 505 days.

(21) Appl. No.: 11/964,947

(22) Filed: Dec. 27, 2007

(65) Prior Publication Data
US 2009/0169762 A1 Jul. 2, 2009

(51) Int. Cl.
C09D 11/00 (2006.01)

(52) U.S. Cl. .............. 347/100; 347/95; 106/31.65

(58) Field of Classification Search ............ 347/95–100; 523/160, 161; 106/31.13, 31.6, 31.65, 31.16
See application file for complete search history.

(56) References Cited

U.S. PATENT DOCUMENTS

| | | | |
|---|---|---|---|
| 5,985,017 A * | 11/1999 | Bugner et al. | 106/31.75 |
| 6,440,203 B2 | 8/2002 | Kato | |
| 6,530,656 B1 | 3/2003 | Teraoka et al. | |
| 6,536,891 B2 | 3/2003 | Oyanagi | |
| 6,695,443 B2 | 2/2004 | Arita et al. | |
| 6,719,420 B2 | 4/2004 | Tomioka et al. | |
| 6,790,878 B2 | 9/2004 | Kurabayashi | |
| 6,846,302 B2 | 1/2005 | Shemesh et al. | |
| 6,864,302 B2 | 3/2005 | Miyabayashi | |
| 6,866,707 B2 * | 3/2005 | Kato | 106/31.6 |
| 6,890,378 B2 | 5/2005 | Yatake et al. | |
| 7,030,172 B2 | 4/2006 | Sakurai | |
| 7,030,174 B2 | 4/2006 | Yatake | |
| 7,037,362 B2 | 5/2006 | Honma et al. | |
| 7,074,843 B2 | 7/2006 | Nakamura et al. | |
| 7,090,813 B2 | 8/2006 | Kuwata | |
| 7,094,813 B2 | 8/2006 | Namba et al. | |
| 2003/0076394 A1 * | 4/2003 | Gotoh et al. | 347/100 |
| 2004/0069183 A1 | 4/2004 | Kamoto et al. | |
| 2004/0186200 A1 | 9/2004 | Yatake | |
| 2004/0237838 A1 | 12/2004 | Yatake et al. | |
| 2005/0124728 A1 | 6/2005 | Komatsu et al. | |
| 2005/0139124 A1 * | 6/2005 | Ito et al. | 106/31.58 |
| 2005/0215663 A1 * | 9/2005 | Berge et al. | 523/160 |
| 2006/0223908 A1 * | 10/2006 | Szajewski et al. | 523/160 |
| 2007/0022902 A1 | 2/2007 | Koga | |
| 2007/0120928 A1 | 5/2007 | Ma et al. | |
| 2007/0139501 A1 | 6/2007 | Sekiguchi | |
| 2007/0157849 A1 | 7/2007 | Kluge et al. | |
| 2007/0242118 A1 | 10/2007 | Koganehira et al. | |
| 2007/0282033 A1 | 12/2007 | Ito et al. | |

FOREIGN PATENT DOCUMENTS

EP 1 375 607 1/2004

OTHER PUBLICATIONS

Edward W. Washburn; The Physical Review; "The Dynamics of Capillary Flow"; Second Series; Mar. 1921; vol. XVII; No. 3; pp. 273-283.
James W. Blease et al; U.S. Appl. No. 60/892,176, filed Feb. 28, 2007; titled "Ink Jet Ink for High Image Quality on Photoglossy Paper and Plain Paper".

* cited by examiner

Primary Examiner — Matthew Luu
Assistant Examiner — Rut Patel
(74) Attorney, Agent, or Firm — Andrew J. Anderson

(57) ABSTRACT

An aqueous inkjet ink suitable for priming photo-images on both photo-glossy receivers and plain papers, said ink including at least 50% by weight water, between 0.5% and 8% by weight of 1,2-pentanediol, a humectant distinct from said 1,2-pentanediol, and between 0.2 and 5% by weight of a dispersed pigment colorant, said dispersed pigment colorant exhibiting an average volume weighted 50th percentile particle size of between 0.001 and 0.075 microns.

20 Claims, No Drawings

INKJET INKS FOR PRINTING ON BOTH PLAIN AND PHOTO-GLOSSY PAPERS

FIELD OF THE INVENTION

This invention relates to inkjet inks and inkjet ink sets formulated to provide excellent images when applied to either plain papers or photo-glossy media.

BACKGROUND OF THE INVENTION

Inkjet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers and thermal bubble formation. In another process, known as continuous inkjet, a continuous stream of droplets is charged and deflected in an image-wise manner onto the surface of the image-recording element, while un-imaged droplets are caught and returned to an ink sump. Inkjet printers have found broad applications across markets ranging from desktop document and photographic-quality imaging, to short run printing and industrial labeling.

Early inkjet inks were formulated much like conventional printing or pen applied inks. As greater attention has been directed towards printing speed, ease of use, reliability, and environmental issues, and with increasing interest in forming improved images, inks have been formulated to work well on specific media. One challenge is to obtain the highest possible image quality on a variety of inkjet receivers. Typically the receivers are categorized as a photoglossy or plain paper receiver. The two types of receivers are distinguished from one another in that the photoglossy receiver is manufactured with a coated layer above the underlying paper support. Photoglossy receivers may be further categorized as having a swellable polymer coating (non-porous media) or a microporous (hydrophilic particles in binder) media, although hybrid designs are also well known. Typical polymer coated media are capable of very high gloss in excess of 60 gloss units at a viewing angle of 60 degrees. Typical microporous media can be designed to have gloss values approaching those of some polymer coated media. The design of both plain paper and photoglossy media vary widely depending on materials and paper manufacturing processes, which should not be construed to limit the scope of the present invention.

For example, inks intended to provide durable and glossy images on photo-glossy image receivers can incorporate film forming polymers and soluble dye colorants while inks intended to provide well adhering fast drying, smooth images on plain papers can include soluble dye colorants, paper penetrants and paper anti-curl agents. The soluble dye inks all suffer from light fade, a problem which is especially significant when archival photo-images are desired and from poor resistance to rewetting. It has been proposed to alleviate the light fade problem by providing dispersed pigment as colorants in place of soluble dyes. However, use of pigments often leads to a reduction in image gloss and poor rub resistance on photo-glossy media and image inhomogeneity or mottle on plain papers. This inherent mottle or graininess problem which arises when applying pigmented inks to plain papers is generally not an issue when applying dye based inks to the same papers because of the fully soluble nature of the dyes and the more even colorant deposits that arise from them.

Representative disclosures of inkjet inks and printing methods said to provide improved images on glossy or coated papers include: Yatake et al., U.S. Pat. No. 7,030,174, Kurabayashi, U.S. Pat. No. 6,790,878B2, while representative disclosures of inkjet inks and printing methods said to provide improved images on plain papers include: Namba, et al., U.S. Pat. No. 7,094,813, Nakamura et al., U.S. Pat. No. 7,074,843B2, Aritu et al., U.S. Pat. No. 6,695,443B2, Teraoka, et al., U.S. Pat. No. 6,530,656B2, and Kato, U.S. Pat. No. 6,440,203B2.

Disclosures of inkjet inks and printing methods recommended to provide improved images on both glossy papers and economical plain papers include Yatake et al., U.S. Pat. No. 6,890,378B2 which describes the use of specific classes of acetylenic surfactants to provide reduced intercolor bleed properties, and Miyabayashi et al., U.S. Pat. No. 6,864,302 and Tomioka et al., U.S. Pat. No. 6,719,420B2, both of which describe the practice of mixing distinct inks having disparate charge characteristics at the recording material surface. The first suggestion suffers in that it promises to improve only a limited number of the known deficiencies while the second two lead to significant problems in inkjet engine maintenance as the inks can conglomerate in the inkjet apparatus during use.

Oyanagi, U.S. Pat. No. 6,536,891B2 describes control of Yellow to Black (Y v K) intercolor bleed on plain papers imaged by piezo jetting by providing inkjet ink sets with specified relationships between the static surface tensions of light (yellow) and dark (black) high viscosity inks. The high ink viscosity can both limit the jet firing frequency and lead to coalescence when the inks are applied quickly, especially to glossy media. Kamoto, et al., US Pub. App. 2004/0069183A1 describes high viscosity inkjet inks with a difference of less than 7 mN/m between the static and dynamic surface tension at surface refresh rates of 0.5 to 35 Hz (i.e. surface ages of 2 s to ~30 ms) relative to the static surface tension of the same ink as providing inks with desired discharge stability from a piezo inkjet ink application system and a high quality recorded image.

Honma, et al., U.S. Pat. No. 7,037,362B2 describes dye based colored inks and pigment based black inks, characterized in having only limited viscosity after evaporation and a specified relationship between the dynamic surface tension of the same ink at surface ages of 10 ms and 1 s, that are said to provide quick drying and limited image bleeding on plain papers. Here, the use of dye based inks inherently leads to image instability on storage. Further, the utility of the approach is limited to dye based inks since pigment based inks set-up under the test conditions and inherently exhibit very high dry down viscosities.

Koga, US Pub. App. 2007/0022902A1 describes high viscosity high dynamic surface tension dye based inks having reduced intercolor bleed on plain papers, and characterized by exhibiting a specified relationship within the ink set between the variously colored ink dynamic surface tensions at surface ages of 30 ms and 1 s. Here, the use of dye based inks inherently leads to image instability on storage. Further, since this publication discussed only dye colorant inks, it provides no teaching relative to the use of pigment colorant inks with respect to plain paper graininess. Ma, et al., US Pub App. 2007/0120928A1 describes inkjet inks having reduced intercolor bleed on glossy photo papers, and characterized by exhibiting a specified relationship within the ink set between the variously colored ink dynamic surface tensions. Specific ink components, formulations and ink physical properties beyond surfactant identity and levels are not disclosed. Sekiguchi, US Pub. App. 2007/0139501A1 describes yellow and black dye based inkjet inks, suitable for use in thermal inkjet printers, the inks said to exhibit high density and reduced intercolor bleed (Yellow v Black) on plain papers when formulated based on the dynamic surface tension relationships of related model inks with no colorant added.

Thus, none of this art provides inkjet inks, inkjet ink sets or inkjet printing methods which can provide high gloss archival images on micro-porous photo-glossy or coated papers, while simultaneously providing low noise images on economical plain papers. This has led to a situation where end users remain faced with the need to choose either between inkjet printer systems designed to produce photo-glossy images or inkjet printer systems designed for plain paper output. Thus, there is an unmet need for inkjet inks, inkjet ink sets, and inkjet printing systems which can provide excellent images when used with both photo-glossy coated papers and economical plain papers.

SUMMARY OF THE INVENTION

It is an object of the invention to provide inkjet inks and inkjet printing methods which can provide high gloss images on micro-porous photo-glossy and coated papers while simultaneously providing low noise images on economical plain papers. It is a further object of this invention to provide storage stable inkjet inks having especially fine sized pigment particles which form images having excellent light and dark stability, high density, high gloss, and low mottle on a variety of printing surfaces.

These objectives are met by providing: an aqueous inkjet ink suitable for printing photo-images on both photo-glossy receivers and plain papers, said ink comprising at least 50% by weight water, between 0.5% and 8% by weight of 1,2-pentanediol, a humectant distinct from said 1,2-pentanediol, and between 0.2 and 5% by weight of a dispersed pigment colorant, said dispersed pigment colorant exhibiting an average volume weighted $50^{th}$ percentile particle size of between 0.001 and 0.075 microns. While the pigment colorant particles can be polymeric dispersed, surfactant dispersed, encapsulated or self-dispersed pigment particles, they are preferentially surfactant dispersed pigment particles. The surfactant dispersant is preferentially a metal salt of oleylmethyltaurate. The dispersed pigment colorant is preferentially chosen from the group consisting of cyan, magenta, yellow, red, green, blue, violet and orange colored pigments. A preferred humectant is glycerol and polyhydric alcohol derivatives thereof. The ink can additionally contain a useful quantity of a polymer acting as a binder or jetting aid. A polyurethane polymer is especially preferred. The ink can further preferentially contain an anionic or neutral surfactant.

In a further embodiment, the ink is part of an ink jet ink set comprising at least two colored inks, both of which are inks according to the invention. In yet another embodiment, the ink jet ink set can include both an ink according to the invention and a colorless ink.

The aims of the present invention are additionally achieved by an inkjet printing method comprising the step of applying to a recording medium by thermal, stream or piezo ejection an ink as described above. More particularly, the invention also provides an inkjet printing method comprising the steps of a) providing an inkjet printer that is responsive to digital data signals; b) loading the printer with an inkjet recording receiver; c) loading the printer with the inkjet ink set of the invention; and d) printing on the inkjet receiver with the ink set of the invention in response to the digital data signals.

In yet another embodiment, the object of the invention is met by providing an ink jet ink container suitable for supplying ink to an ink ejector, said container comprising one of more inks fulfilling the above requirements.

DETAILED DESCRIPTION OF THE INVENTION

The ink compositions known in the art of ink jet printing may be aqueous- or solvent-based, and in a liquid, solid or gel state at room temperature and pressure. Aqueous-based ink compositions are preferred because they are more environmentally friendly as compared to solvent-based inks, plus most printheads are designed for use with aqueous-based inks. The inks of the invention are aqueous inks, comprising at least 50% and preferably at least 65% by weight water.

Dispersed pigment colorants are employed in the inks of the invention. Pigment-based ink compositions are used because such inks render printed images having higher optical densities and better resistance to light and ozone as compared to printed images made from other types of colorants. The ink is colored by the dispersed pigment colorant. The ink composition may be, e.g., yellow, magenta, cyan, black, gray, red, violet, blue, green, orange, brown, white, etc.

The pigment colorants are employed at between 0.2 and 5% by weight in the inks. In a light ink variant mode, the dispersed pigment colorants may be present in light inks or the so-called photo-inks at between 0.2% and 1% by weight, and in a preferred light ink mode are present at between 0.4 and 0.9% by weight. In a normal ink mode the dispersed pigment colorants are present at between 1% by weight and 5% by weight, and in a preferred normal ink mode are present at between 2% by weight and 4% by weight. The dispersed pigment colorant in the inks of the invention exhibits an average volume weighted $50^{th}$ percentile particle size of between 0.001 and 0.075 microns. The ink of the invention preferentially has dispersed pigment colorant particles exhibiting an average volume weighted $50^{th}$ percentile particle size of between 0.005 and 0.050 microns. Substantially smaller pigment particles form less stable images, while substantially larger pigment particles fail to provide desired gloss characteristics when printed on glossy media.

Inkjet inks of the invention comprise between 0.5% and 8% by weight of 1,2 pentanediol. Preferably they comprise between 0.75% and 5% by weight of 1,2-pentanediol and most preferable they comprise between 1% and 4.5% by weight of 1,2-pentanediol. 1,2-pentanediol is a known dynamic surface tension reducing agent, and has been observed to provide improved reduced graininess or mottle for images printed on plain papers, as do other known dynamic surface tension reducing agents. It has been surprising found, however, that use of 1,2-pentanediol advantageously enables formation of storage stable inks when employing pigments having an average volume weighted $50^{th}$ percentile particle size of less than 0.075 microns in accordance with the invention, while the closely related 1,2-hexanediol leads to pigment particle instability in these ranges when combined with the colorant pigment dispersions. Thus, inks of the invention advantageous enable improved reduced graininess or mottle for images printed on plain papers, desired gloss performance for images printed on glossy media, and are storage stable.

A wide variety of organic and inorganic pigments, alone or in combination with additional pigments or dyes, can be used in the cyan, magenta and yellow, and ancillary ink compositions, which may be employed in the ink sets of the present invention. Pigments that may be used in the invention include those disclosed in, for example, U.S. Pat. Nos. 5,026,427; 5,086,698; 5,141,556; 5,160,370; and 5,169,436. The exact choice of pigments will depend upon the specific application and performance requirements such as color reproduction and image stability.

Pigments suitable for use in the invention include, but are not limited to, azo pigments, monoazo pigments, di-azo pigments, azo pigment lakes, β-Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black.

Typical examples of pigments that may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

White pigments, which may be used in ancillary white ink compositions, may be those which are capable of rendering said ink composition white. Any of several white pigments, which are commonly used in this field, may be employed. Employed as such white pigments may be, for example, white inorganic pigments, white organic pigments, and fine white hollow polymer particles. White pigments include inorganic pigments such as sulfates of alkaline earth metals such as barium sulfate, carbonates of alkaline earth metals such as calcium carbonate, silica such as fine silicic acid powder, synthetic silicates, calcium silicate, alumina, alumina hydrates, titanium oxide, zinc oxide, talc, and clay. Specifically, titanium oxide is known as a white pigment which exhibits desired covering properties, coloring (tinting) properties, and desired diameter of dispersed particles. White organic pigments include organic compound salts disclosed in Japanese Publication No. 11-129613, and alkylenebismelamine derivatives disclosed in Japanese Publication Numbers 11-140365 and 2001-234093. Specific commercially available products of the aforesaid white pigments are Shigenox OWP, Shigenox OWPL, Shigenox FWP, Shigenox FWG, Shigenox UL, and Shigenox U (all are commercial product names, by Hakkoru Chemical Co.). Additionally fine white hollow polymer particles such as fine thermoplastic particles comprised substantially of an organic polymer, which are disclosed in U.S. Pat. No. 4,089,800 may be employed.

Pigment-based ink compositions employing non-self-dispersed pigments that are useful in the invention may be prepared by any method known in the art of inkjet printing. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) is carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium that is typically the same as or similar to the medium used to dilute the pigment dispersion in step (b). Inert milling medium is optionally present in the milling step (a) in order to facilitate break up of the pigments to primary particles. Inert milling media include such materials as polymeric beads, glasses, ceramics, metals and plastics as described, for example, in U.S. Pat. No. 5,891, 231. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, particularly useful dispersants include anionic, cationic or nonionic surfactants such as sodium dodecylsulfate, or potassium or sodium oleylmethyltaurate as described in, for example, U.S. Pat. No. 5,679,138, U.S. Pat. No. 5,651,813 or U.S. Pat. No. 5,985,017, the disclosures of which are incorporated by reference.

Self-dispersing pigments that are dispersible without the use of a dispersant or surfactant can be used in the invention. Pigments of this type are those that have been subjected to a surface treatment such as oxidation/reduction, acid/base treatment, or functionalization through coupling chemistry. The surface treatment can render the surface of the pigment with anionic, cationic or non-ionic groups such that a separate dispersant is not necessary. The preparation and use of covalently functionalized self-dispersed pigments suitable for inkjet printing are reported by Bergemann, et al., in U.S. Pat. No. 6,758,891 B2 and U.S. Pat. No. 6,660,075 B2, Belmont in U.S. Pat. No. 5,554,739, Adams and Belmont in U.S. Pat. No. 5,707,432, Johnson and Belmont in U.S. Pat. Nos. 5,803,959 and 5,922,118, Johnson et al in and U.S. Pat. No. 5,837,045, Yu et al in U.S. Pat. No. 6,494,943 B1, and in published applications WO 96/18695, WO 96/18696, WO 96/18689, WO 99/51690, WO 00/05313, and WO 01/51566, Osumi et al., in U.S. Pat. No. 6,280,513 B1 and U.S. Pat. No. 6,506,239 B1, Karl, et al., in U.S. Pat. No. 6,503,311 B1, Yeh, et al., in U.S. Pat. No. 6,852,156 B2, Ito et al., in U.S. Pat. No. 6,488,753 B1 and Momose et al., in EP 1,479,732 A1. Examples of commercially available self-dispersing type pigments include Cab-O-Jet 200®, Cab-O-Jet-250®, Cab-O-Jet-260®, Cab-O-Jet-270®, and Cab-O-Jet 300® (Cabot Specialty Chemicals, Inc.) and Bonjet CW-1® and CW-2® (Orient Chemical Industries, Ltd.).

Polymeric dispersants are also known and useful in aqueous pigment-based ink compositions. Polymeric dispersants may be added to the pigment dispersion prior to, or during the milling step (a), and include polymers such as homopolymers and copolymers; anionic, cationic or nonionic polymers; or random, block, branched or graft polymers. Polymeric dispersants useful in the milling operation include random and block copolymers having hydrophilic and hydrophobic portions; see for example, U.S. Pat. No. 4,597,794; U.S. Pat. No. 5,085,698; U.S. Pat. No. 5,519,085; U.S. Pat. Nos. 5,272,201; 5,172,133; U.S. Pat. No. 6,043,297 and WO 2004/111140A1; and graft copolymers; see for example, U.S. Pat. No. 5,231,131; U.S. Pat. No. 6,087,416; U.S. Pat. No. 5,719,204; or U.S. Pat. No. 5,714,538. Typically, these polymeric resins are copolymers made from hydrophobic and hydrophilic monomers. In this case, the copolymers are designed to act as dispersants for the pigment by virtue of the arrangement and proportions of hydrophobic and hydrophilic monomers. The pigment particles are colloidally stabilized by the dispersant and are referred to as a polymer dispersed pigment dispersion.

Polymeric dispersants (copolymers) are not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer may take the form of a random terpolymer or an ABC tri-block wherein, at least one of the A, B and C blocks is chosen to be the hydrophilic monomer and the remaining blocks are hydrophobic blocks dissimilar from one another.

Especially useful copolymer dispersants are those where the hydrophobic monomer is selected from benzyl methacrylate or acrylate, or from methacrylic or acrylic acid esters containing an aliphatic chain having twelve or more carbons, which aliphatic chains may be linear or branched. Examples of methacrylic and acrylic acid esters having twelve or more carbons include; lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, decyltetradecyl methacrylate, and the like. Preferably the methacrylate or acrylate monomer is stearyl or lauryl methacrylate or acrylate. The hydrophobic portion of the polymer may be prepared from one or more of the hydrophobic monomers.

Preferred copolymer dispersants are those where the hydrophilic monomer is selected from carboxylated monomers. Preferred polymeric dispersants are copolymers prepared from at least one hydrophilic monomer that is an acrylic acid or methacrylic acid monomer, or combinations thereof Preferably, the hydrophilic monomer is methacrylic acid.

Typically, the weight average molecular weight of the copolymer dispersant has an upper limit such that it is less than about 50,000 Daltons. Desirably the weight average molecular weight of the copolymer is less than about 25,000 Daltons; more preferably it is less than 15,000 and most preferably less than 10,000 Daltons. The copolymer dispersants preferably have a weight average molecular weight lower limit of greater than about 500 Daltons.

In a preferred embodiment, copolymer dispersants are employed wherein the hydrophobic monomer is benzyl methacrylate and is present from 50 weight percent to 80 weight percent relative to the total weight of the polymeric dispersant and the hydrophilic monomer is methacrylic acid.

In a second preferred embodiment, copolymer dispersants are employed which comprise a hydrophobic monomer having a carbon chain length of greater than or equal to 12 carbons present in an amount of at least 10% by weight of the total copolymer, and more preferably greater than 20% by weight, an optional additional hydrophobic monomer comprising an aromatic group and the hydrophilic monomer is methacrylic acid. For example, the additional aromatic group containing monomer may be benzyl acrylate or benzyl methacrylate. A preferred additional monomer is benzyl methacrylate.

The total amount of hydrophobic monomers, comprising the monomer having a chain with greater than or equal to 12 carbons and optionally, monomer containing an aromatic group, may be present in the polymer in an amount of 20 to 95% by weight of the total polymer. The hydrophobic aromatic-group containing monomer may be present in an amount from about 0 to 85% by weight of the total polymer, more preferably from about 0 to 60%, and most preferably from about 0 to 50%. A particularly preferred embodiment is a terpolymer of benzyl methacrylate, stearyl methacrylate and methacrylic acid.

Particularly useful polymeric pigment dispersants are further described in US 2006/0012654 A1 and US 2007/0043144A1, the disclosures of which are incorporated herein by reference.

Encapsulating type polymeric dispersants and polymeric dispersed pigments thereof can also be used in the invention. Specific examples are described in U.S. Pat. No. 6,723,785, U.S. Pat. No. 6,852,777, US 2004/0132942 A1, 2005/0020731 A1, 2005/00951 A1, 2005/0075416 A1, 2005/0124726 A1, 2004/007749 A1, and 2005/0124728 A1, the disclosures of which are incorporated by reference. Encapsulating type polymeric dispersants can be especially useful because of their high dispersion stability on keeping and low degree of interaction with ink components. Composite colorant particles having a colorant phase and a polymer phase are also useful in aqueous pigment-based inks of the invention. Composite colorant particles are formed by polymerizing monomers in the presence of pigments; see for example, US 2003/0199614 A1; US 2003/0203988 A1; or US 2004/0127639. Microencapsulated-type pigment particles are also useful and consist of pigment particles coated with a resin film; see for example U.S. Pat. No. 6,074,467.

In addition to dispersed pigment colorants, the inks of the invention can further contain dyes as supplemental colorants. Dyes suitable for use in the invention include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Specific examples of dyes usable in the present invention include but are not limited to: Acid Yellows, Reactive Yellows, Food Yellows, Acid Reds, Direct Reds, Reactive Reds, Food Reds, Acid Blues, Direct Blues, Reactive Blues, Food Blues, Acid Blacks, Direct Blacks, Reactive Blacks, Food Black, CAS No. 224628-70-0 sold as JPD Magenta EK-1 Liquid from Nippon Kayaku Kabushiki Kaisha; CAS No. 153204-88-7 sold as Intrajet® Magenta KRP from Crompton and Knowles Colors; and the metal azo dyes disclosed in U.S. Pat. Nos. 5,997,622 and 6,001,161. Also useful in the invention as supplemental colorants are polymeric dyes or loaded-dye/latex particles. Examples of polymeric dyes are described in U.S. Pat. No. 6,457,822 B1 and references therein. Examples of loaded-dye/latex particles are described in U.S. Pat. No. 6,431,700 B1; US 2004/0186199 A1; US 2004/0186198 A1; US 2004/0068029 A1; US 2003/0119984 A1; and US 2003/0119938 A1. The supplemental colorants used in the ink composition of the invention may be present in any effective amount, generally from 0.1 to 10% by weight, and preferably from 0.5 to 6% by weight.

The inks of the invention further include one or more water-soluble humectants (also called co-solvents), distinct from and in addition to the required 1,2-pentanediol employed in the ink compositions, in order to provide additional useful properties to the inkjet ink. Typical useful properties include but are not limited to: preventing the ink composition from drying out or crusting in the nozzles of the printhead, aiding solubility of the components in the ink composition, aiding firing properties of the ink form an ejector, facilitating penetration of the ink composition into the image-recording element after printing, aiding gloss, suppressing intercolor bleed, suppressing coalescence, and suppressing mechanical artifacts such as paper cockle and curl during and after printing. While 1,2-pentanediol may provide some of these properties, by employing at least one additional humectant distinct from the 1,2-pentanediol employed, the combination of plain paper and glossy media performance and humectant requirements may be better controlled.

Any water-soluble humectant known in the ink-jet art and compatible with the other requirements of the invention can be employed. By water-soluble is meant that a mixture of the employed humectant(s) and water is homogeneous. While an individual humectant can be employed, useful inkjet inks can employ mixtures of two, three or more humectants, each of which imparts a useful property to the inkjet ink. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, dipropyleneglycol, the polyethylene glycols with average molecular weights ranging from 200 to about 5000 Daltons, the polypropylene glycols with average molecular weights ranging from 200 to about 5000 Daltons, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-hepanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides and sugar alcohols and thioglycol; (3) polyoxygenated polyols and their derivatives such as diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives; (4) nitrogen-containing compounds such as urea, 2-pyrrolidone, N-methyl-2-pyrrolidone, imidazolidinone, N-hydroxyethyl acetamide, N-hydroxyethyl-2-pyrrolidinone, 1-(hydroxyethyl)-1,3-imidazolidinone, 1,3-dimethyl-2-imidazolidinone, and 1,3-dihydroxy-2-imidazolidinone; (5) sulfur-containing compounds such as 2,2'-thiodiethanol, dimethyl sulfoxide and tetramethylene sulfone; and (6) water soluble N-oxides such as 4-methylmorpholine-N-oxides. Of these, glycerol and the polyhydric alcohol derivatives thereof are preferred and glycerol is especially preferred. The polyhydric alcohol derivatives of glycerol include the glycerol ethoxides, glycerol propoxides and glyceryths. The humectant can be employed alone or in combination with one or more additional listed humectants. The useful humectants have melting points below the typical operating temperature of the intended printer system to avoid the formation of crystalline deposits on the printhead or in the maintenance system. Practically, this means that the useful humectants have melting points below 30° C., preferably below 20° C. and more preferably below 10° C. When glycerol and the polyhydric alcohol derivatives thereof are employed, they can preferably be employed at between 1 and 20% by weight, more preferable at between 2 and 15% by weight and most preferable at between 3 and 10% by weight. While any quantity of distinct water soluble humectants singly or in combination and 1,2-pentanediol can be employed, the total quantity of distinct water soluble humectant and 1,2-pentanediol is typically at between 3 and 45 percent by weight, preferably between 8 and 35 percent by weight and more preferably at between 8 and 20 percent by weight. Typical aqueous-based ink compositions useful in the invention may contain, for example, 50-95% water and 3-45% combined 1,2-pentanediol and distinct humectants, based on total weight of the ink.

The pH of the aqueous ink compositions of the invention may be adjusted by the addition of organic or inorganic acids or bases. Useful inks may have a preferred pH of from about 2 to 10, depending upon the type of dye or pigment being used and depending on the charge characteristics of the other ink components employed. Anionic charge stabilized anti-abrasion polymers are employed in inks having a pH of above about 6, with preferred pH ranges of between 7 and 11 and a more preferred pH range of between 7.5 and 10. Typical inorganic acids include nitric, hydrochloric, phosphoric and sulfuric acids. Typical organic acids include methanesulfonic, acetic, formic and lactic acids. Typical inorganic bases include alkali metal hydroxides and carbonates. Typical organic bases include ammonia, triethanolamine and tetramethylethlenediamine. The well known Goods buffers can also be employed.

Inkjet ink compositions may also contain non-colored particles such as inorganic particles or polymeric particles. The use of such particulate addenda has increased over the past several years, especially in inkjet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548B2 describes the use of a water-dispersible polymer in dye-based inks in order to improve light and ozone resistance of the printed images. For use of such particles to improve gloss differential, light and/or ozone resistance, waterfastness, rub resistance and various other properties of a printed image; see for example, U.S. Pat. No. 6,598,967B1. Colorless ink compositions that contain non-colored particles and no colorant may also be used. Colorless ink compositions are often used in the art as "fixers" or insolubilizing fluids that are printed under, over, or with colored ink compositions in order to reduce bleed between colors and waterfastness on plain paper; see for example, U.S. Pat. No. 5,866,638 or U.S. Pat. No. 6,450,632B1. Colorless inks are also used to provide an overcoat to a printed image, usually in order to improve scratch resistance and waterfastness; see for example, US 2003/0009547A1 or EP 1,022,151A1. Colorless inks are also used to reduce gloss differential in a printed image; see for example, U.S. Pat. No. 6,604,819 B2; US 2003/0085974A1; US 2003/0193553A1; or US 2003/0189626A1.

Examples of inorganic particles useful in the invention include, but are not limited to, alumina, boehmite, clay, calcium carbonate, titanium dioxide, calcined clay, aluminosilicates, silica, or barium sulfate.

The non-colored particles used in the ink compositions may be present in any effective amount, generally from 0.01 to 20% by weight, and preferably from 0.01 to 6% by weight. The exact choice of non-colored particles will depend upon the specific application and performance requirements of the printed image.

Polymers can be present in the inkjet inks of the invention. The polymers can act as binders or jetting-aids or can fulfill other useful functions. These polymers can be classified as water-soluble polymers, water-reducible polymers or water-dispersible polymeric particles.

By the term "water-soluble" is meant that the polymer is dissolved in water such that scattering is not observed when a dilute solution of the polymer is analyzed using dynamic light scattering or any other technique well known in the art of particle analysis.

By the term "water-reducible" is meant that the polymer can be diluted with water to form reasonably stable dispersions of polymer aggregates swollen by solvent and water, as described in "Organic Coatings: Science and Technology" (2nd Edition by Wicks, Jones and Papas, published by Wiley-Interscience, 1999). Such polymers have hydrophilic groups in some monomers, but are not water soluble until neutralized by base.

By the term "water-dispersible" is meant that the polymer exists in the form of discrete particles in water, the particles being dispersed or suspended and often stabilized against flocculation and settling by the use of dispersing agents. In contrast to a water-soluble polymer, a dilute solution of a water-dispersible polymer exhibits scattering when analyzed using dynamic light scattering or any other technique well known in the art of particle analysis.

The water soluble polymers useful in the ink compositions include nonionic, anionic, and amphoteric polymers. Representative examples of water soluble polymers include, polyvinyl alcohols, polyvinyl acetates, polyvinyl pyrrolidones, carboxymethyl cellulose, polyethyloxazolines, polyamides and alkali soluble resins, polyurethanes (such as those found in U.S. Pat. No. 6,268,101), polyacrylic acids, styrene-acrylic methacrylic acid copolymers (such as Joncryl® 70 from S.C. Johnson Co., TruDot® IJ-4655 from MeadWestvaco Corp., and Vancryl® 68S from Air Products and Chemicals, Inc and polymers exemplified in U.S. Pat. No. 6,866,379 and US 2005/0134665 A1.

The water-dispersible polymer particles are generally classified as either addition polymers or condensation polymers, both of which are well known to those skilled in the art of polymer chemistry. Examples of water-dispersible polymer particle classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric; film-forming, non-film-forming, fusible, or heavily cross-linked and can have a wide range of molecular weights and glass transition temperatures. Examples of water dispersible polymeric particles used in inkjet inks are styrene-acrylic copolymers sold under the trade names Joncryl® (S.C. Johnson Co.), Ucar™ (Dow Chemical Co.), Jonrez® (MeadWestvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes (such as the Witcobonds® from Witco Corp.). Core-shell polymer particles have also been employed in inkjet inks for water-fastness and rub-resistance improvements (U.S. Pat. Nos. 5,814,685, 5,912,280, 6,057, 384, 6,271,285, 6,858,301). Additional examples of water dispersible polymer particles include the thermoplastic resin particles as disclosed in U.S. Pat. Nos. 6,147,139 and 6,508, 548. The polymer particles may be a mixture of high and low glass transition temperature polymers such as those disclosed in U.S. Pat. No. 6,498,202. Additionally, core-shell polymer particles as described in U.S. Pat. Nos. 5,814,685, 5,912,280, 6,057,384, 6,271,285, and 6,858,301 can be employed. It is also possible to include in the ink, in addition to the durability enhancing polymer particles, heavily cross-linked polymer particles.

Particularly preferred polymers for use in the inks of the invention are water soluble polyacrylate polymers and polyurethane latex binder polymers.

While any useful quantity of a water soluble polyacrylate polymer can be employed, the inks of the invention can preferably comprise between 0.1% and 3% by weight of a water soluble polyacrylate polymer. The water soluble polyacrylate polymers can be either addition polymers or condensation polymers, both of which are well known to those skilled in the art of polymer chemistry. Specific examples include, but are not limited to: acrylic acid polymer; methacrylic acid polymer; styrene-acrylic acid copolymer, styrene-acrylic acid-acrylic acid alkyl ester copolymer, styrene-maleic acid copolymer, styrene-maleic acid-acrylic acid alkyl ester copolymer, styrene-methacrylic acid copolymer, styrene-methacrylic acid-acrylic acid alkyl ester copolymer, styrene-maleic acid hemi ester copolymer, vinyl naphthalene-acrylic acid copolymer, vinyl naphthalene maleic acid copolymer and so forth. Especially preferred water soluble polyacrylate polymers include benzylmethacrylate-acrylic acid copolymers and styrene-maleic acid hemi ester copolymers. These polymers are rendered water soluble by the presence of the acid group originating in the acrylic acid, maleic acid or methacrylic acid moiety of the polymer. For polymers including acid groups, the extent of polymer charge stabilization is quantified as the polymer acid number (AN). A calculated polymer acid number is defined as the number of moles of acid monomer per gram of monomer in the polymer forming feedstock times 56 (which is the molecular weight of potassium hydroxide). A measured acid number is the number of moles of acid found per gram of polymer times 56, when titrating with potassium hydroxide in water. The water soluble polyacrylate polymer preferably exhibits an acid number between 100 and 400 and more preferably between 140 and 300 and a weight average molecular weight Mw between 5000 and 20,000 and more preferably between 6,000 and 16,000.

While any useful quantity of a polyurethane latex binder can be employed, the inks of the invention can preferably comprise between 0.1 and 3% by weight, and more preferably between 0.5 and 2% by weight of a polyurethane latex binder.

The polyurethane latex binder is formed from at least one monomer comprising at least two hydroxyl groups and at least one carboxyl group and another monomer comprising at least two isocyanate groups. While diisocyanates are typically used in the art of polyurethane chemistry, triisocyanates can also be used. Examples of diisocyanates include isophorone diisocyanate and others described in the above references. The polyurethanes used in the invention are optionally derived from an additional monomer comprising at least two hydroxyl groups and which is different from the monomer having at least two hydroxyl groups. These optional monomers are typically higher molecular weight monomers having a molecular weight of less than 3000 Daltons. They are often referred to in the art as polyols. Examples include polyols and polyhydroxy derivatives of polycarbonates, polyethers, polyesters, polyacetals, polyacrylates, polyester amides and polythioethers. Preferably the optional monomer is a polycarbonate or a polyether. More preferably, the optional monomer comprising at least two hydroxyl groups is a poly(hexamethylene carbonate)diol. Examples of monomers comprising at least two hydroxyl groups and at least one carboxylic acid group are 2,2-bis(hydroxymethyl)propionic acid and the hydroxyethylether of 4,4-bis(4-hydroxyphenyl)-valeric acid. Other examples are described in U.S. Pat. No. 6,268,101 B2 and US 2003/0184629 A1 and references cited therein. Water-dispersible polyurethanes are disclosed as binders in pigmented inks in U.S. Pat. No. 6,533,408, and particularly useful polyurethanes for pigmented inkjet inks which exhibit good jetting performance and good resulting image durability are described in US 2004/0085419A1, the disclosures of both are incorporated herein by reference. The polyurethane used in the invention has a weight average molecular weight, Mw, of greater than 7,500 Daltons. If Mw is less than 7,500 Daltons, then the inkjet ink composition may not provide adequate stain and scratch resistance. A Mw of greater than 10,000 Daltons is preferred. The maximum Mw of the polyurethane is not particularly limited, but is generally dictated by the physical property requirements of the composition and the method by which it will be applied, as discussed below. If the ink composition is used as an inkjet ink for a thermal printhead, then the maximum Mw of the polyurethane is preferably 50,000 Daltons. The acid number of the polyurethane is provided by acid groups that are, in turn, provided by the at least one monomer comprising at least two hydroxyl groups. The acid groups are preferably carboxylic acid groups, but any type of acid groups may be used. The polyurethane latex binder can have an acid number between 50 and 200 and preferably has an acid number between 60 and 150 and most preferably between 70 to 110. The polyurethane used in the invention can exhibit a Tg of between 20 and 180° C., preferably a Tg of between 40 and 120° C., and more preferably a Tg of between 60 and 100° C.

When these kinds of polymers are employed, best results are obtained when the weight ratio of dispersed pigment to the sum of water soluble polyacrylate polymer and polyurethane latex binder is between 3:1 and 1:2. More preferably, the weight ratio of dispersed pigment to the sum of water soluble polyacrylate polymer and polyurethane latex binder is between 2:1 and 1:1. Lower quantities of polymer can cause poor jetting or poor film formation while higher quantities of polymer can cause poor jetting, clogging of ejectors or printer maintenance stations and ink coalescence on many printing media.

Surfactants may be added to the inks of the invention to adjust the surface tension to an appropriate level. The surfactants may be anionic, cationic, amphoteric or nonionic and used at, e.g., levels of 0.01 to 5% of the ink composition. Examples of suitable nonionic surfactants include, linear or secondary alcohol ethoxylates (such as the Tergitol® 15-S and Tergitol® TMN series available from Union Carbide and the Brij® series from Uniquema), ethoxylated alkyl phenols (such as the Triton® series from Union Carbide), fluoro surfactants (such as the Zonyls® from DuPont; and the Fluorads® from 3M), fatty acid ethoxylates, fatty amide ethoxylates, ethoxylated and propoxylated block copolymers (such as the Pluronic® and Tetronic® series from BASF, ethoxylated and propoxylated silicone based surfactants (such as the Silwet® series from CK Witco), alkyl polyglycosides (such as the Glucopons® from Cognis) and acetylenic polyethylene oxide surfactants (such as the Surfynols® from Air Products). Additionally any conformationally asymmetric water-soluble polyoxygenated hydrocarbons enabling surface tension reduction can be employed as a surfactant. Further examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphated esters of alkyl and aryl alcohols, including the Strodex® series from Dexter Chemical), phosphonated and amine oxide surfactants and anionic fluorinated surfactants. Examples of amphoteric surfactants include; betaines, sultaines, and aminopropionates. Examples of cationic surfactants include; quaternary ammonium compounds, cationic amine oxides, ethoxylated fatty amines and imidazoline surfactants. Additional examples of the above surfactant classes are described in "McCutcheon's Emulsifiers and Detergents: 1995, North American Editor".

A biocide may be added to an inkjet ink composition to suppress the growth of microorganisms such as molds, fungi, etc. in aqueous inks. A preferred biocide for an ink composition is Proxel® GXL (Zeneca Specialties Co.) at a final concentration of 0.0001-0.5 wt. % or Kordek®. Additional additives, which may optionally be present in an inkjet ink composition include thickeners, conductivity enhancing agents, anti-kogation agents, drying agents, waterfastness agents, dye solubilizers, chelating agents, binders, light stabilizers, viscosifiers, buffering agents, anti-mold agents, anti-curl agents, stabilizers and defoamers.

The exact choice of ink components will depend upon the specific application and performance requirements of the printhead from which they are to be jetted. The inks of the invention are preferentially applied to a plain paper or a photo-glossy medium by thermal, stream or piezo ejection. Thermal and piezoelectric printheads which can function either in drop-on-demand ink ejection mode or continuous ink ejection mode each require ink compositions with a different set of physical properties in order to achieve reliable and accurate jetting of the ink, as is well known in the art of inkjet printing. Acceptable viscosities are no greater than 20 cP, and preferably in the range of about 1.0 to 6.0 cP and more preferably in the range of 1.5 to 4.0 cP. Acceptable static surface tensions are no greater than 60.0 mN/m, and preferably in the range of 28.0 mN/m to 40.0 mN/m.

The inks of the invention can be used alone or they can be used in combination. When used alone, the ink can be employed in a monochrome printer. When used in combination, the inks can be of similar color as in a monochrome printer or of distinct color as in a full color printer. In each case, the inks are preferentially applied to a paper by thermal or piezo ejection. When used in combination, two inks of similar color but distinct composition, such as a light ink and a dark ink can be used to form a finely graduated or continuous photo-tone image. Alternatively, distinct colored inks can be combined to form an ink jet ink set. When inks according to the invention are used in combination, they are preferably applied in an overlapping mode to a common area of the paper or in non-overlapping mode to adjacent areas of the paper, all as know in the ink jet ink application art. A color ink set preferably has at least cyan, magenta, and yellow colored inks with preferred additions of black ink(s), such as Photo-black inks and text black inks, clear inks to act as gloss aids and protective overcoats, and optional red, green, blue, brown, orange, violet, photo-cyan and photo-magenta inks, and so forth to aid in pictorial reproduction, all as known in the ink jet art. A color ink set can contain both distinct colored inks and similarly colored inks of distinct composition. The ink jet ink set according to the invention can comprise the inventive ink alone or in several inks of the ink jet ink set.

The ink jet inks, ink jet ink-sets and image forming methods described above may be usefully employed with any suitable ink jet image receiver known in the art. This includes, but is not limited to both matte and glossy forms of plain papers, cardstocks, cardboards, transparent or opaque plastics and vinyls, treated papers, coated papers and multilayer image receivers. Microporous glossy receivers are especially preferred as imaging media for use with the inventive ink jet inks, ink jet ink-sets, and ink jet image forming methods.

Cyan, magenta and yellow inkjet inks in accordance with the invention may be formulated with combinations of 1,2-pentanediol as a dynamic surface tension reducing agent and distinct surfactants and humectants as disclosed in commonly assigned, concurrently filed, copending U.S. Ser. No. 11964, 846, the disclosure of which is incorporated by reference herein in its entirety, to provide an inkjet ink set wherein each of the cyan, magenta and yellow inks is characterized by exhibiting a viscosity normalized dynamic surface tension at surface refresh ages of 0.01s of less than 23.0 mN/(m*cP); and wherein the average viscosity normalized dynamic surface tension at a surface refresh age of 0.01s for the cyan, magenta and yellow inks taken together is less than 22.0 mN/(m*cP) in order to optimize performance of the ink set for printing on both plain paper and glossy media. Further, the static surface tensions of the inks in a useful ink set can have specific relationships in order to minimize intercolor bleed, as described in commonly assigned patent application No. 60/892,176 filed Feb. 28, 2007, the disclosures of which are incorporated by reference. In one useful embodiment employing cyan, magenta and yellow inks, the static surface tensions of the yellow ink is at least 2.0 mN/m lower than the static surface tensions of the cyan, and magenta inks of the ink set. In another useful embodiment employing cyan, magenta, yellow and black inks, the static surface tension of the yellow ink is at least 2.0 mN/m lower than the static surface tensions of the cyan, magenta and black inks of the ink set. In yet another useful embodiment employing cyan, magenta, yellow, black and colorless protective inks, the static surface tensions of the yellow ink and of the colorless protective ink are both at least 2.0 mN/m lower than the static surface tensions of the cyan, magenta and black inks of the ink set, and in a preferred embodiment, the static surface tension of the colorless protective ink is at least 1.0 mN/m lower than the static surface tension of the yellow ink. In all such embodiments, the dynamic surface tension at 10 milliseconds surface age for all inks of the ink sets may be greater than or equal to 35 mN/m as described in 60/892,176.

The ink jet inks of the invention can be packaged in an art known ink jet ink container suitable for supplying ink to an ink ejector. The container can have one or more ink reservoirs each holding a distinct inventive ink. In one embodiment, intended for desktop applications, the reservoirs can individually hold up to about 20 ml of ink. In embodiments intended for commercial applications, the reservoirs can individually hold up to about 5 liters of ink.

EXAMPLES

Example 1

Thirty colored inks were prepared according to the following formulas (percents are weight percents). All components employed, except for the pigments, were water soluble at the quantities used. Inks were characterized for particle size using a Microtrac Inc., Nanotrac Brand Ultrafine Particle-Size Analyzer (UPA).

Cyan Ink 1 comprised: 2.2% PB15:3 pigment (dispersed using potassium oleylmethyltaurate (KOMT) similarly as described in U.S. Pat. No. 5,679,138; U.S. Pat. No. 5,651,813 or U.S. Pat. No. 5,985,017), 5.4% ethylene glycol, 7.5% glycerol, 0.75% Surfynol-465, 1.3% TriDot® styreneacrylate polymer (IJ4655) and 0.02% Kordek with the balance as water. The pigment particles in this ink showed an average volume weighted $50^{th}$ percentile particle size of 0.045 micron.

Magenta Ink 2 comprised: 3% PR122 pigment (dispersed using potassium oleylmethyltaurate (KOMT) similarly as described in U.S. Pat. No. 5,679,138; U.S. Pat. No. 5,651,813 or U.S. Pat. No. 5,985,017), 8% ethylene glycol, 8% glycerol, 0.5% Surfynol-465, 1.3% TruDot® styrene-acrylate polymer (IJ4655), 0.15% triethanolamine and 0.02% Kordek with the balance as water. The pigment particles in this ink showed an average volume weighted $50^{th}$ percentile particle size of 0.016 micron.

Yellow Ink 3 comprised: 2.75% PY155 pigment (dispersed using potassium oleylmethyltaurate (KOMT) similarly as described in U.S. Pat. No. 5,679,138; U.S. Pat. No. 5,651,813 or U.S. Pat. No. 5,985,017), 5% ethylene glycol, 10% glycerol, 0.5% PK90 surfactant, 1.3% TruDot® styrene-acrylate polymer (IJ4655), 0.13% triethanolamine and 0.02% Kordek with the balance as water. The pigment particles in this ink showed an average volume weighted $50^{th}$ percentile particle size of 0.010 micron. Taken together Cyan Ink 1, Magenta Ink 2 and Yellow Ink 3 form Ink set 1.

Test inks 4 through 30 (a total of twenty seven test inks, nine cyan, nine magenta and nine yellow inks) were prepared by adding 1%, 2% 3% or 4% of 1,2-hexanediol or 1%, 2%, 3%, 4% or 5% of 1,2-pentanediol respectively to the above formulations.

These inks were individually tested for stability by storing portions in sealed vials for 4 weeks at 60 C and re-evaluating the inks for particle size. Inks were considered storage stable if the incorporated pigment particles were resistant to particle growth or decomposition on storage as determined by an increase in the average volume weighed $50^{th}$ percentile particle size of less than 20%. The magenta and yellow inks were observed to be somewhat less stable to added 1,2-alkanediol than the cyan inks. This effect is believed to be related to the intrinsic character of the colorant-dispersant interaction.

The inks were loaded into ink jet ink cartridges suitable for supplying ink to an ink jet ink ejector.

The quality of these inks for forming smooth images on plain papers was evaluated by combining the inks into ink sets differentiated by identity and quantity of the added 1,2-alkanediol, i.e. ink set 1 was a control with no incorporated 1,2-alkanediol, ink set 2 had 1% by weight of 1,2-hexanediol in each of the cyan, magenta and yellow inks, while ink sets 3 through 10 contained cyan, magenta and yellow inks having respectively 2, 3, or 4% each by weight of 1,2-hexanediol or 1%, 2%, 3%, 4% or 5% by weight of 1,2-pentanediol. These ink sets were employed to print primary color, i.e. cyan, and magenta, and secondary color, i.e. red, green and blue, color patches using a Canon model i960 Ink Jet Printer (thermal ejectors) onto five representative plain papers, namely: Georgia Pacific Ink Jet Paper (20#, 90 brightness), Xerox Extra Bright Ink jet Paper (24#, 95 brightness), Hammermill Fore MP Multipurpose Paper (20#, 92 brightness), Hewlett-Packard Multipurpose Paper (20#, 92 brightness) and Hewlett-Packard Advanced Paper (20#, 92 brightness). The printed patches were visually evaluated for homogeneity using a Kodak "Grain Ruler" as described in Kodak Technical Data Publication E-58 titled "Print Grain Index" published July 2000. The graininess or mottle of each cyan, magenta, red, green and blue patch was evaluated for its Print Grain Index (PGI) following that procedure for each of the five listed plain papers. The added alkanediols enabled a lowering of the PGI for both primary colors (the cyan and magenta colors patches printed alone) and secondary colors (the red, green and blue patches created by overlapping printing of two primary color patches) with higher incorporated quantity of alkanediols enabling a greater reduction in image mottle in each and every case as evaluated by the PGI method. The mottle reduction effect was additionally observed in continuous tone images involving unequal mixtures of two or three inks to form intermediate colors, grays and blacks. The average of these twenty five measurements PGI measurements for each ink set is reported. Here smaller numbers correspond to a more homogeneous and less grainy or mottled image. A difference of 4 units is readily apparent to 95% of visually average viewers. Results of these keeping and printing tests are tabulated in Table I below. It is understood that this test methodology was employed as a matter of convenience and that ink sets formed from individual inks differing in the incorporated alkanediols exhibit similar excellent results.

TABLE I

| Ink set number | Inks (C M & Y) | 1,2 diol added | Quantity | Ink Set Stability to keeping | Ink Set Plain Paper Mottle |
|---|---|---|---|---|---|
| 1 | 1, 2, & 3 | none | | pass | 67 |
| 2 | 4, 5 & 6 | 1,2-hexanediol | 1% | pass | 64 |
| 3 | 7, 8 & 9 | 1,2-hexanediol | 2% | fail | 59 |
| 4 | 10, 11, & 12 | 1,2-hexanediol | 3% | fail | 56 |
| 5 | 13, 14, & 15 | 1,2-hexanediol | 4% | fail | 55 |
| 6 | 16, 17, & 18 | 1,2-pentanediol | 1% | pass | 58 |
| 7 | 19, 20, & 21 | 1,2-pentanediol | 2% | pass | 57 |
| 8 | 22, 23, & 24 | 1,2-pentanediol | 3% | pass | 56 |
| 9 | 25, 26, & 27 | 1,2-pentanediol | 4% | pass | 55 |
| 10 | 28, 29, & 30 | 1,2-pentanediol | 5% | pass | 53 |

It is readily apparent that only the 1,2-pentanediol additive provides inks and ink sets that are both storage stable and capable of providing a visually significant reduction in PGI or plain paper mottle.

Example 2

Cyan ink 1, Magenta ink 2 and Yellow ink 3 from the above ink sets were modified by replacing the individual cyan, magenta or yellow pigment dispersions with corresponding pigment dispersions that had been ground to distinct particle sizes to form inks 31 through 48. These inks were individually printed onto Kodak Glossy Media and the 20 deg gloss measured using a Glossometer. Higher Gloss readings correspond to a more reflective image reminiscent of traditional photographic images. These results are reported in Table II below.

TABLE II

| Ink number | Pigment employed | 50% percentile particle size in ink (nm) | 20deg Gloss on Glossy Media |
|---|---|---|---|
| 31 | PB15:3 | 165 | 3.6 |
| 32 | " | 134 | 6.2 |
| 33 | " | 87 | 43.1 |
| 34 | " | 32 | 64.4 |
| 35 | " | 31 | 65.9 |
| 36 | " | 31 | 62.4 |
| 37 | PR122 | 118 | 11.1 |
| 38 | " | 102 | 52.9 |

TABLE II-continued

| Ink number | Pigment employed | 50% percentile particle size in ink (nm) | 20deg Gloss on Glossy Media |
|---|---|---|---|
| 39 | " | 17 | 98.9 |
| 40 | " | 18 | 98.1 |
| 41 | " | 12 | 110 |
| 42 | " | 12 | 109 |
| 43 | PY155 | 199 | 9.7 |
| 44 | " | 14 | 70.9 |
| 45 | " | 11 | 89.2 |
| 46 | " | 9 | 107 |
| 47 | " | 9 | 112 |
| 48 | " | 9 | 109 |

It is readily apparent that high levels of gloss on glossy media are only obtained when using smaller sized pigments.

Example 3

Magenta ink 49 was prepared generally like magenta ink 2 except that the PR122 was employed in the ink as polymer dispersed pigment particles (at 1:3 polymer to pigment weight ratio) where the polymeric dispersant was a terpolymer of benzylmethacrylate:octadecylmethacrylate:acrylic acid (37:30:33 ratio). The pigment particles in this ink showed an average volume weighted $50^{th}$ percentile particle size of 0.087 micron.

Magenta inks 50 to 53 were prepared like magenta ink 49 except that the inks included 3% or 6% of 1,2-hexanediol (inks 50 and 51 respectively) or 3% or 6% of 1,2-pentanediol (inks 52 and 53 respectively). These inks were evaluated for ink stability, plain paper mottle and glossy media gloss as described above. The inks employing these larger pigment particles were stable to incubation, even in the presence of 3% or 6% of the 1,2-pentanediol or 1,2-hexanediol. Images printed on the same plain papers as previously described showed marked improvements in plain paper mottle as described above. Images printed on Kodak Photo-Glossy Media showed a marked degradation in 20 degree gloss, again following the pattern disclosed above.

Example 4

Inventive Inkjet ink set 11 including cyan, magenta, and yellow inks according to the invention was prepared as follows:

Inventive Cyan Ink 54 comprised: 2.2% PB15:3 pigment (dispersed using potassium oleylmethyltaurate (KOMT) similarly as described in U.S. Pat. No. 5,679,138; U.S. Pat. No. 5,651,813 or U.S. Pat. No. 5,985,017), 7% glycerol, 5% 1,5-pentanediol; 3% 1,2-pentanediol; 1.0% Surfynol-465, 1.3% of a benzylmethacrylate-acrylic acid co-polymer at weight ratio 67:33 with acid number ~200, 1.2% of a polycarbonate-polyurethane with acid number 76 and Mw ~26,000 and 0.02% Kordek anti-bacterial with the balance as water. The pigment particles in this ink showed an average volume weighted $50^{th}$ percentile particle size of 0.060 micron.

Inventive Magenta Ink 55 comprised: 3% PR122 pigment (dispersed using potassium oleylmethyltaurate (KOMT) similarly as described in U.S. Pat. No. 5,679,138; U.S. Pat. No. 5,651,813 or U.S. Pat. No. 5,985,017), 6.5% glycerol, 6.5% 1,5-pentanediol; 2% triethyleneglycol, 2.25% 1,2-pentanediol; 0.75% Surfynol-465, 1% of a benzylmethacrylate-acrylic acid co-polymer at weight ratio 67:33 with acid number ~200, 1.2% of a polycarbonate-polyurethane with acid number 76 and Mw ~26,000 and 0.02% Kordek anti-bacterial with the balance as water. The pigment particles in this ink showed an average volume weighted $50^{th}$ percentile particle size of 0.013 micron.

Inventive Yellow Ink 56 comprised: 2.75% PY155 pigment (dispersed using potassium oleylmethyltaurate (KOMT) similarly as described in U.S. Pat. No. 5,679,138; U.S. Pat. No. 5,651,813 or U.S. Pat. No. 5,985,017), 7.3% glycerol, 4.3% 1,5-pentanediol; 2.25% 1,2-pentanediol; 0.5% Tergitol15s5 surfactant, 0.9% of a benzylmethacrylate-acrylic acid co-polymer at weight ratio 67:33 with acid number ~200, 1.2% of a polycarbonate-polyurethane with acid number 76 and Mw ~26,000 and 0.02% Kordek anti-bacterial with the balance as water. The pigment particles in this ink showed an average volume weighted $50^{th}$ percentile particle size of 0.009 micron. Taken together Cyan Ink 54, Magenta Ink 55 and Yellow Ink 56 form Ink set 2.

A comparative inkjet inkset 12 was prepared according to these general formulas except that the 1,2-pentanediol was replaced by ethyleneglycol.

Images printed on the same plain papers as previously described showed marked improvements in plain paper mottle when the inventive inkjet inkset 11 was employed compared to the results obtained with the comparative inkjet inkset 12. Images printed on Kodak Photo-Glossy Media showed excellent 20 degree gloss with both inkjet inksets. Quite surprisingly, the inventive inkjet inkset 11 showed even higher gloss, lower haze and produced visually sharper images than could be obtained with the comparable inkjet inkset 12 that did not include the 1,2-pentanediol. Using a 70 patch target, the inventive inkjet inkset 11 showed a average 60 degree gloss rating of 94 while the comparative inkjet ink set 12 without the 1,2-pentanediol showed an average 60 degree gloss rating of 89. This result indicates a surprising synergistic effect on haze and gloss between the small sized pigment particles and the 1,2-pentanediol.

The invention has been described in detail with particular reference to certain preferred embodiments thereof, but it will be understood that variations and modifications can be effected within the spirit and scope of the invention.

The invention claimed is:

1. An aqueous inkjet ink comprising at least 50% by weight water, between 0.5% and 8% by weight of 1,2-pentanediol, a humectant distinct from said 1,2-pentanediol, and between 0.2 and 5% by weight of a surfactant dispersed pigment colorant, said surfactant dispersed pigment colorant exhibiting an average volume weighted $50^{th}$ percentile particle size of between 0.001 and 0.075 microns.

2. The ink of claim 1 comprising between 1 and 5% by weight of surfactant dispersed pigment colorant.

3. The ink of claim 1 comprising between 0.75 and 5% by weight of 1,2-pentanediol.

4. The ink of claim 1 wherein said dispersed pigment colorant exhibits an average volume weighted $50^{th}$ percentile particle size of between 0.005 and 0.050 microns.

5. The ink of claim 1 wherein said surfactant is a metal salt of oleylmethyltaurate.

6. The ink of claim 1 wherein said dispersed pigment colorant is chosen from the group consisting of cyan, magenta, yellow, red, green, blue, violet and orange colored pigments.

7. The ink of claim 1 wherein said dispersed pigment is a black colored pigment.

8. The ink of claim 1 wherein the humectant comprises glycerol or a polyhydric alcohol derivative thereof.

9. The ink of claim 1 further comprising at least one polymer.

10. The ink of claim 9 comprising a polyurethane polymer binder.

11. The ink of claim 10 further comprising a water soluble polyacrylate polymer.

12. An ink jet ink set comprising at least two colored inks, both of which are inks according to claim 1.

13. An ink jet ink set of claim 12, comprising at least two distinctly colored inks, both of which are inks according to claim 1.

14. An ink jet ink set of claim 12, comprising at least two commonly colored inks, both of which are inks according to claim 1.

15. An inkjet recording method comprising applying an ink according to claim 1 to a recording medium by thermal, stream or piezo ejection.

16. An inkjet recording method of claim 15, comprising the steps of:
    a) providing a thermal, stream or piezo inkjet printer that is responsive to digital data signals;
    b) loading said printer with an inkjet recording element;
    c) loading said printer with an inkjet ink according to claim 1, and
    d) printing an image on said inkjet recording element using said inkjet ink in response to said digital signals.

17. The inkjet recording method according to claim 16, wherein the printer comprises a thermal print head.

18. The inkjet recording method of claim 17, wherein the inkjet ink comprises between 0.75 and 5% by weight of 1,2-pentanediol.

19. The inkjet recording method of claim 17, wherein the dispersed pigment colorant in the inkjet ink exhibits an average volume weighted $50^{th}$ percentile particle size of between 0.005 and 0.050 microns.

20. The inkjet recording method of claim 17, wherein the inkjet ink further comprises a polyurethane polymer binder and a water soluble polyacrylate polymer.

* * * * *